United States Patent
Holland et al.

(10) Patent No.: US 9,471,955 B2
(45) Date of Patent: Oct. 18, 2016

(54) MULTIPLE DISPLAY PIPELINES DRIVING A DIVIDED DISPLAY

(71) Applicant: Apple Inc., Cupertino, CA (US)

(72) Inventors: Peter F. Holland, Los Gatos, CA (US); Brijesh Tripathi, Los Altos, CA (US); Dinesh M. Shedge, Cupertino, CA (US)

(73) Assignee: Apple Inc., Cupertino, CA (US)

(*) Notice: Subject to any disclaimer, the term of this patent is extended or adjusted under 35 U.S.C. 154(b) by 194 days.

(21) Appl. No.: 14/309,645

(22) Filed: Jun. 19, 2014

(65) Prior Publication Data

US 2015/0371607 A1    Dec. 24, 2015

(51) Int. Cl.
  *G06T 1/20*     (2006.01)
  *G06T 1/60*     (2006.01)
  *G06F 3/14*     (2006.01)
  *G09G 5/399*    (2006.01)

(52) U.S. Cl.
  CPC .............. *G06T 1/60* (2013.01); *G06F 3/1438* (2013.01); *G06T 1/20* (2013.01); *G09G 5/399* (2013.01); *G09G 2310/0221* (2013.01); *G09G 2352/00* (2013.01); *G09G 2360/06* (2013.01)

(58) Field of Classification Search
  CPC ......... G06T 1/60; G06T 1/20; G06F 3/1438; G09G 5/399; G09G 2352/00; G09G 2360/06; G09G 2310/0221
  See application file for complete search history.

(56) References Cited

U.S. PATENT DOCUMENTS

| | | |
|---|---|---|
| 4,811,205 A | 3/1989 | Normington et al. |
| 5,829,025 A | 10/1998 | Mittal |
| 6,005,546 A | 12/1999 | Keene |
| 6,157,395 A | 12/2000 | Alcorn |
| 6,256,710 B1 | 7/2001 | Yazdy et al. |
| 6,460,115 B1 | 10/2002 | Kahle et al. |
| 6,643,745 B1 | 11/2003 | Palanca et al. |
| 6,721,847 B2 | 4/2004 | Hursey |
| 7,127,573 B1 | 10/2006 | Strongin et al. |
| 7,522,167 B1 | 4/2009 | Diard et al. |

(Continued)

FOREIGN PATENT DOCUMENTS

| | | |
|---|---|---|
| CN | 103119547 A | 5/2013 |
| EP | 1784021 A2 | 5/2007 |

(Continued)

OTHER PUBLICATIONS

International Search Report and Written Opinion in International Application No. PCT/US2015/029866, mailed Aug. 11, 2015, 14 pages.

(Continued)

*Primary Examiner* — Rodney Amadiz
(74) *Attorney, Agent, or Firm* — Rory D. Rankin; Meyertons, Hood, Kivlin, Kowert & Goetzel, P.C.

(57) ABSTRACT

Systems, apparatuses, and methods for driving a split display with multiple display pipelines. Frames for driving a display are logically divided into portions, a first display pipeline drives a first portion of the display, and a second display pipeline drives a second portion of the display. To ensure synchronization between the two display pipelines, a repeat vertical blanking interval (VBI) signal is generated if either of the display pipelines has not already received the frame packet with configuration data for the next frame. When the repeat VBI signal is generated, both display pipelines will repeat processing of the current frame.

17 Claims, 14 Drawing Sheets

(56) References Cited

U.S. PATENT DOCUMENTS

| | | |
|---|---|---|
| 7,617,344 B2 | 11/2009 | Nozaki et al. |
| 7,925,804 B2 | 4/2011 | Nara |
| 7,975,107 B2 | 7/2011 | Beckmann et al. |
| 8,127,088 B2 | 2/2012 | Kolovson |
| 8,140,771 B2 | 3/2012 | Arimilli et al. |
| 8,180,963 B2 | 5/2012 | Conte et al. |
| 8,180,975 B2 | 5/2012 | Moscibroda et al. |
| 8,234,478 B1 | 7/2012 | Roberts et al. |
| 8,244,981 B2 | 8/2012 | Wang et al. |
| 8,922,571 B2 | 12/2014 | Tripathi et al. |
| 9,035,961 B2 | 5/2015 | Tripathi et al. |
| 2006/0044328 A1 | 3/2006 | Rai et al. |
| 2007/0079073 A1 | 4/2007 | Rosenbluth et al. |
| 2008/0150920 A1* | 6/2008 | Yen .............. G06F 3/1438 345/204 |
| 2008/0252647 A1 | 10/2008 | Rai et al. |
| 2008/0297525 A1 | 12/2008 | Rai |
| 2009/0106496 A1 | 4/2009 | Knebel |
| 2009/0132764 A1 | 5/2009 | Moll et al. |
| 2010/0079445 A1* | 4/2010 | Hendry .............. G09G 5/395 345/418 |
| 2011/0249086 A1* | 10/2011 | Guo .............. H04N 7/147 348/14.12 |
| 2012/0072679 A1 | 3/2012 | Biswas et al. |
| 2012/0147020 A1* | 6/2012 | Hussain .............. G06T 1/00 345/522 |
| 2013/0033510 A1 | 2/2013 | Dou et al. |

FOREIGN PATENT DOCUMENTS

| | | |
|---|---|---|
| TW | 200608198 A | 3/2006 |
| TW | 201142810 A1 | 12/2011 |
| TW | 201243802 A1 | 11/2012 |

OTHER PUBLICATIONS

International Search Report and Written Opinion in application No. PCT/US2013/058881, mailed Dec. 3, 2013, 8 pages.

Office Action in Taiwan Patent Application No. 102132822, mailed Feb. 5, 2015, 8 pages.

Office Action in Taiwan Patent Application No. 104116559, mailed Jul. 12, 2016, 11 pages.

* cited by examiner

MULTIPLE DISPLAY PIPELINES DRIVING A DIVIDED DISPLAY

BACKGROUND

1. Technical Field

Embodiments described herein relate to the field of graphical information processing and more particularly, to utilizing multiple display pipelines to drive separate portions of an image frame to a divided display.

2. Description of the Related Art

Part of the operation of many computer systems, including portable digital devices such as mobile phones, notebook computers and the like, is to employ a display device, such as a liquid crystal display (LCD), to display images, video information/streams, and data. Accordingly, these systems typically incorporate functionality for generating images and data, including video information, which are subsequently output to the display device. Such devices typically include video graphics circuitry (i.e., a display pipeline) to process images and video information for subsequent display.

In digital imaging, the smallest item of information in an image is called a "picture element," more generally referred to as a "pixel." For convenience, pixels are generally arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of ordered image frames, or frames for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store the pixels for image and video frame information. The information in a frame buffer typically consists of color values for every pixel to be displayed on the screen.

A constant interval between images allows a video stream or animated image to appear to move smoothly. Without a constant interval, movement of objects and people in the video stream would appear erratic and unnatural. Before the use of LCD displays and digital video standards became common, analog cathode ray tube televisions and monitors used a signal called the Vertical Blanking Interval (VBI) to re-position the electron gun from the bottom right corner of the screen back to the top left where each video frame began. The VBI signal has continued to be present in modern video systems even though its original purpose is obsolete, and it can provide a constant interval for updating image frames.

A display pipeline may be configured to support display resolutions up to a certain resolution. High resolution displays, such as displays having horizontal resolution on the order of 4000 pixels (or 4k resolution), have become increasingly prevalent. A display pipeline designed for low resolution displays may be unable to support the pixel bandwidth required to display pixels on the screen for these high resolution displays. Additionally, in some cases, the frame refresh rate may be 120 hertz (Hz) or higher, increasing the amount of processing the display pipeline is required to perform per second.

In view of the above, methods and mechanisms for processing and driving pixels to high resolution displays are desired.

SUMMARY

Systems, apparatuses, and methods for driving pixels to high resolution displays are contemplated.

In one embodiment, an apparatus may include two display pipelines and a master timing generator. Each source frame of a sequence of source frames may be logically partitioned into a plurality of portions. The portions of the source frames may then be retrieved and processed by the display pipelines and presented on a respective display screen, which may be a high definition display. For example, in one embodiment, frames may be logically divided in half vertically, and a separate display pipeline may be utilized to drive each half. Accordingly, a first display pipeline may drive a first half of the screen and a second display pipeline may drive a second half of the screen, with a resultant single image or video frame being shown on the display. In this way, each display pipeline may be configured to perform only half of the overall pixel processing.

Each display pipeline may include one or more internal pixel-processing pipelines for fetching and processing source frames. Each display pipeline may also include a First-In-First-Out (FIFO) buffer which may include a plurality of entries and a control unit coupled to the FIFO. The control unit may be configured to receive a plurality of frame packets, each of which may correspond to one of the source frames, and each frame packet may include a header and one or more commands. The control unit may also be configured to store each frame packet in an entry of the FIFO buffer. New frame packets may be sent out from the device processor to each display pipeline in advance of the corresponding frame to which the packet corresponds. Both display pipelines may be configured to switch to a new parameter FIFO packet on the same frame.

In one embodiment, while processing a given frame, each display pipeline may determine if the frame packet corresponding to the next frame has already been received, and each display pipeline may send an indication to the master timing generator if the frame packet corresponding to the next frame has already been received. If both display pipelines have received the frame packet for the next frame, then a regular vertical blanking interval (VBI) signal may be generated by the master timing generator indicating that the display pipelines should process the next frame for display. If either of the display pipelines has not received the frame packet for the next frame, then a repeat VBI signal may be generated by the master timing generator indicating the display pipelines should repeat the previous frame.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
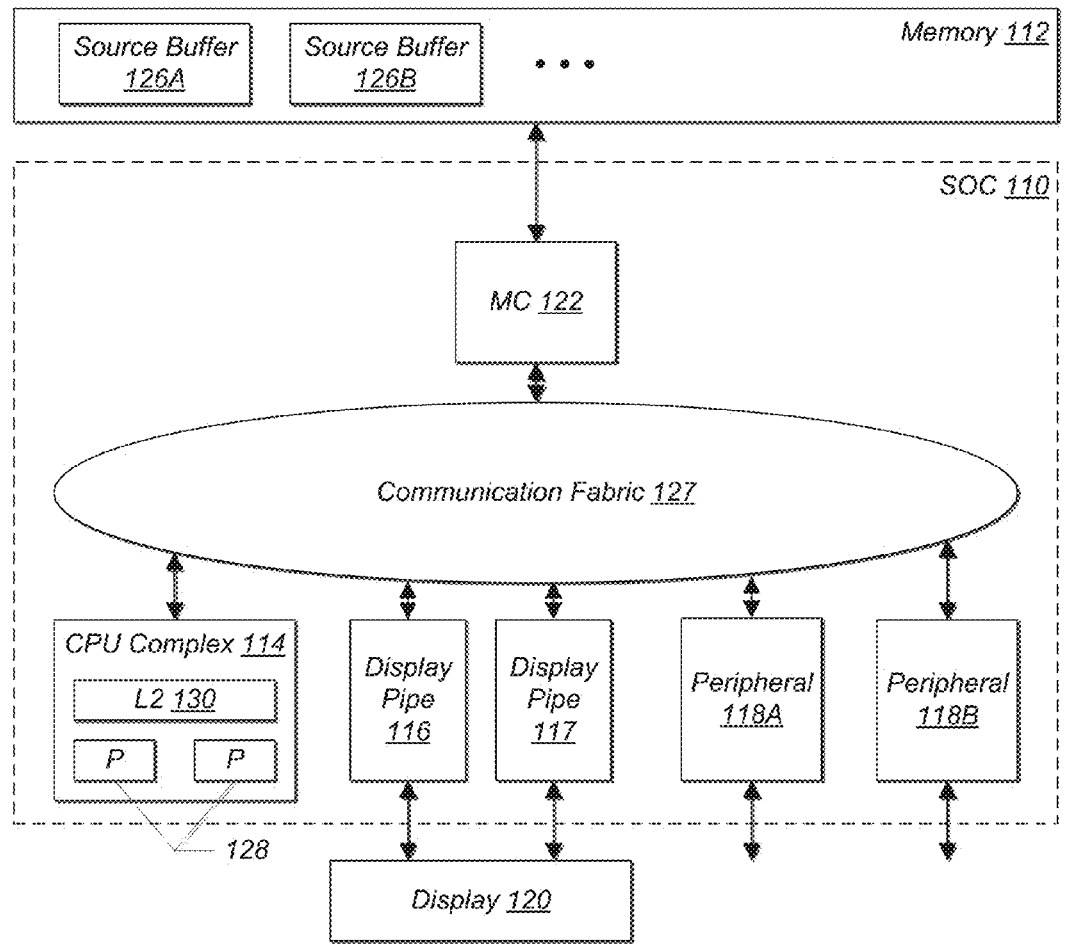
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

TERMINOLOGY

The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a display pipeline . . . . " Such a claim does not foreclose the apparatus from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, display pipes 116 and 117, peripheral components 118A-118B (more briefly, "peripherals"), a memory controller 122, and a communication fabric 127. The components 114, 116, 118A-118B, and 122 may all be coupled to the communication fabric 127. The memory controller 122 may be coupled to the memory 112 during use. Similarly, the display pipes 116 and 117 may be coupled to the display 120 during use. In the illustrated embodiment, the CPU complex 114 includes one or more processors 128 and a level two (L2) cache 130.

The display pipes 116 and 117 may include hardware to process one or more still images and/or one or more video sequences for display on the display 120. Generally, for each source still image or video sequence, the display pipes 116 and 117 may be configured to generate read memory operations to read the data representing respective portions of the frame/video sequence from the memory 112 through the memory controller 122.

The display pipes 116 and 117 may be configured to perform any type of processing on the image data (still images, video sequences, etc.). In one embodiment, the display pipes 116 and 117 may be configured to scale still images and to dither, scale, and/or perform color space conversion on their respective portions of frames of a video sequence. The display pipes 116 and 117 may be configured to blend the still image frames and the video sequence frames to produce output frames for display. Each of the display pipes 116 and 117 may also be more generally referred to as a display pipeline, display control unit, or a display controller. A display control unit may generally be any hardware configured to prepare a frame for display from one or more sources, such as still images and/or video sequences.

More particularly, each of the display pipes 116 and 117 may be configured to retrieve respective portions of source frames from one or more source buffers 126A-126B stored in the memory 112, composite frames from the source buffers, and display the resulting frames on corresponding portions of the display 120. Source buffers 126A and 126B are representative of any number of source frame buffers which may be stored in memory 112. Accordingly, display pipes 116 and 117 may be configured to read the multiple source buffers 126A-126B and composite the image data to generate the output frame.

The display 120 may be any sort of visual display device. The display 120 may be a liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device.

In some embodiments, the display 120 may be directly connected to the SOC 110 and may be controlled by the display pipes 116 and 117. That is, the display pipes 116 and 117 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display pipes 116 and 117 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasma interface, a cathode ray tube (CRT) interface, any proprietary display interface, etc.

In one embodiment, each display pipeline 116 and 117 may be configured to operate independently of each other. In this embodiment, each display pipeline 116 and 117 may be configured to drive a separate display (although only one display is shown in FIG. 1). For example, in this embodiment, display pipeline 116 may be configured to drive a first display and display pipeline 117 may be configured to drive a second display. In another embodiment, the display 120 may be logically divided in half vertically. In this embodiment, display pipeline 116 may drive a first half of the screen, and display pipeline 117 may drive a second half of the screen. In this way, each display pipeline 116 and 117 may be configured to perform only half of the overall pixel processing. Software executing on processors 128 may be configured to program display pipelines 116 and 117 to operate according to the chosen embodiment. It is noted that in other embodiments, other numbers of display pipelines may be utilized in SOC 110 to drive a single display 120. For example, in another embodiment, four display pipelines may be utilized to drive a single display 120 which is logically partitioned into four portions.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or an interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals 118A-118B may include audio peripherals such as microphones, speakers, interfaces to microphones and speakers, audio processors, digital signal processors, mixers, etc. The peripherals 118A-118B may include interface controllers for various interfaces external to the SOC 110 including interfaces such as Universal Serial Bus (USB), peripheral component interconnect (PCI) including PCI Express (PCIe), serial and parallel ports, etc. The peripherals 118A-118B may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
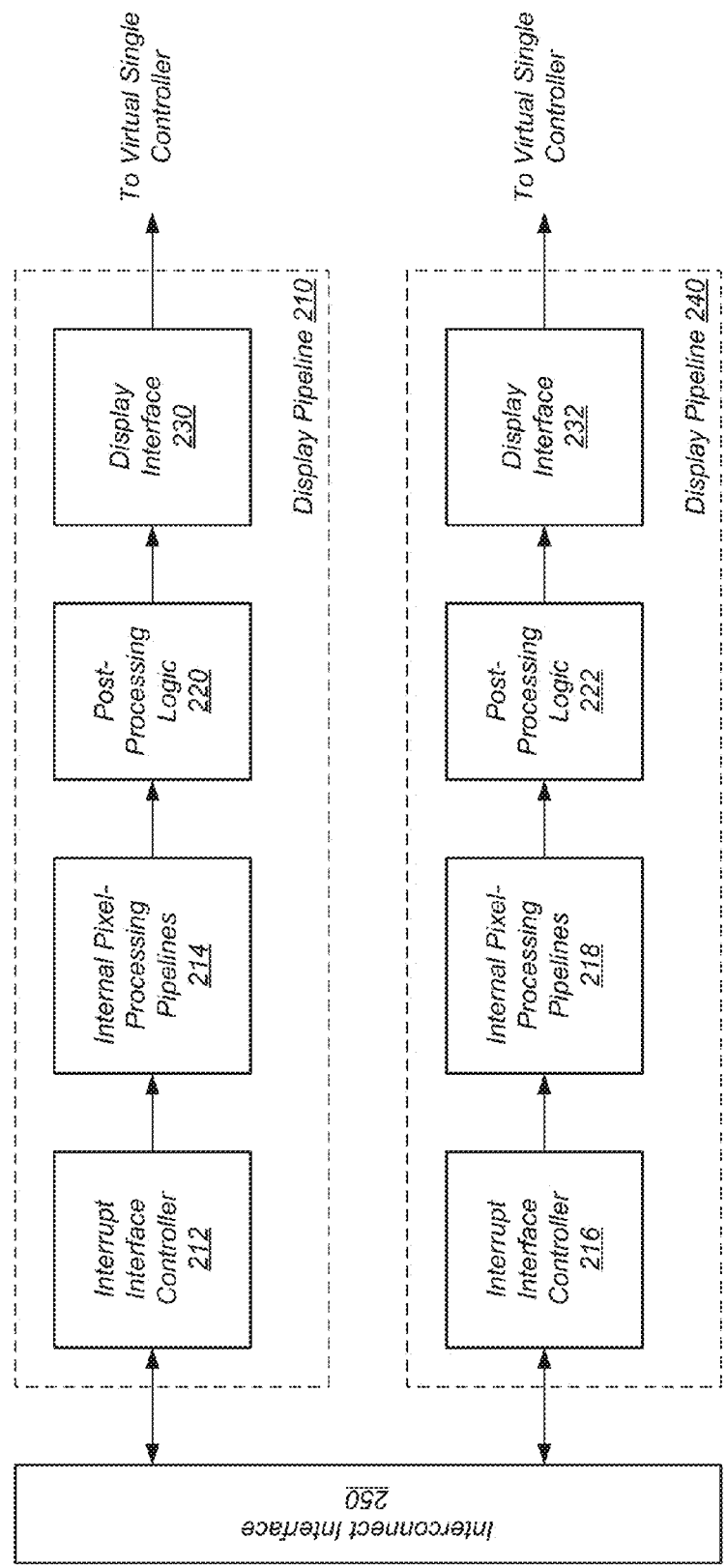
FIG. 2 is a block diagram of one embodiment of dual display pipelines for use in a SOC.

Turning now to FIG. 2, a generalized block diagram of one embodiment of dual display pipelines for use in a SOC is shown. The two display pipelines 210 and 240 may be coupled to interconnect interface 250. Although two display pipelines are shown, in other embodiments, the host SOC (e.g., SOC 110) may include another number of display pipelines. Each of the display pipelines may be configured to process half of a source image and display the resultant half of the destination image on the corresponding half of the display (not shown).

Figure 10:
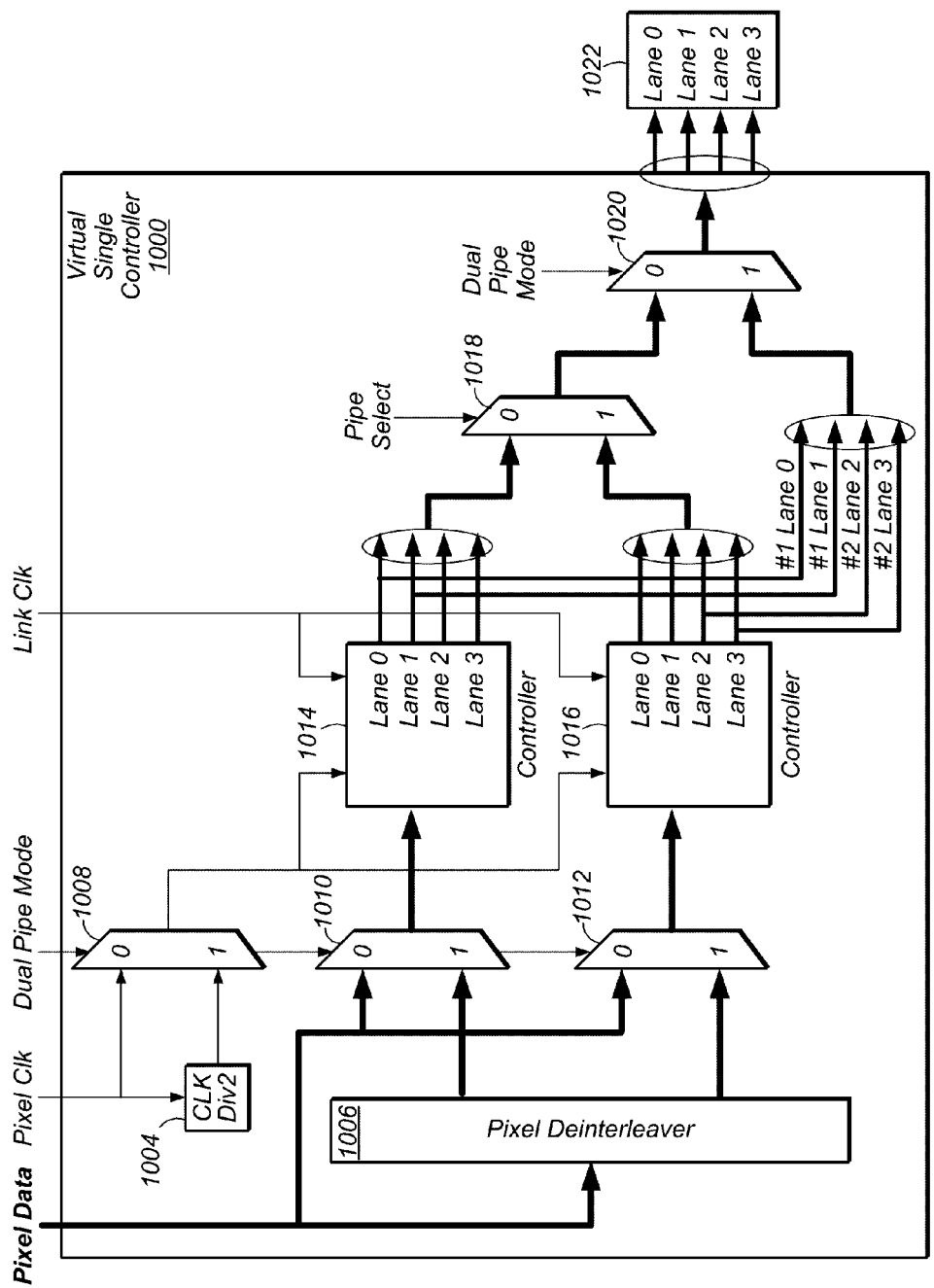
FIG. 10 is a block diagram illustrating one embodiment of a virtual single controller.

In one embodiment, display pipelines 210 and 240 may send rendered graphical information to the display via a virtual single controller (e.g., virtual single controller 1000 of FIG. 10). The interconnect interface 250 may include multiplexers and control logic for routing signals and packets between the display pipelines 210 and 240 and a top-level fabric. The interconnect interface 250 may correspond to communication fabric 127 of FIG. 1.

Display pipelines 210 and 240 may include interrupt interface controllers 212 and 216, respectively. The interrupt interface controllers 212 and 216 may include logic to expand a number of sources or external devices to generate interrupts to be presented to the internal pixel-processing pipelines 214 and 218, respectively. The controllers 212 and 216 may provide encoding schemes, registers for storing interrupt vector addresses, and control logic for checking, enabling, and acknowledging interrupts. The number of interrupts and a selected protocol may be configurable.

Display pipelines 210 and 240 may include one or more internal pixel-processing pipelines 214 and 218, respectively. The internal pixel-processing pipelines 214 and 218 may include one or more ARGB (Alpha, Red, Green, Blue) pipelines for processing and displaying user interface (UI) layers. The internal pixel-processing pipelines 214 and 218 may also include one or more pipelines for processing and displaying video content such as YUV content. In some embodiments, internal pixel-processing pipelines 214 and 218 may include blending circuitry for blending graphical information before sending the information as output to post-processing logic 220 and 222, respectively.

The display pipelines 210 and 240 may include post-processing logic 220 and 222, respectively. The post-processing logic 220 may be used for color management, ambient-adaptive pixel (AAP) modification, dynamic backlight control (DPB), panel gamma correction, and dither. The display interfaces 230 and 232 may handle the protocol for communicating with the internal panel display. For example, the Mobile Industry Processor Interface (MIPI) Display Serial Interface (DSI) specification may be used. Alternatively, a 4-lane Embedded Display Port (eDP) specification may be used. The post-processing logic and display interface may also be referred to as the display backend.

In one embodiment, when in split-display mode, display pipelines 210 and 240 may receive a first indication if they are allowed to proceed to the next frame at the end of a current frame. Control logic (not shown) may be configured to determine if both of display pipelines 210 and 240 have the frame packet for the next frame soon enough to process the next frame, and if so, then the control logic may be configured to send the first indication to display pipelines 210 and 240 to proceed to the next frame. In one embodiment, the first indication may be a regular VBI signal.

If either of display pipelines 210 and 240 is not ready to drive the next frame, then the control logic may be configured to send a second indication to display pipelines 210 and 240 instructing them to repeat the current frame rather than going to the next frame. Whether or not a pipeline is ready may be defined in a variety of ways. For example, if two or more pipelines have configuration information for a frame such that each may drive a portion of the frame in a manner that presents the frame with a desirable appearance (e.g., no noticeable artifacts, undesired brightness or color inconsistencies between portions), then the pipelines may be deemed ready. Otherwise, at least one pipeline does not have the information needed to provide for a pleasing, overall frame appearance, then that pipeline may be deemed not ready. As one example, display pipeline 210 may have configuration data for the next frame in time but display pipeline 240 may not. Therefore, in this case, display pipeline 210 may repeat the same frame again rather than moving on to the next frame even though display pipeline 210 is ready to process the next frame. In one embodiment, the second indication may be a repeat VBI signal. A VBI signal (regular or repeat) may be a pulse or other signal that establishes the starting point of a new vertical blanking interval (VBI). The VBI may be defined as the period of time from when the last pixel of a frame is driven to the display to when the first pixel of a subsequent frame is driven to the display.

Figure 3:
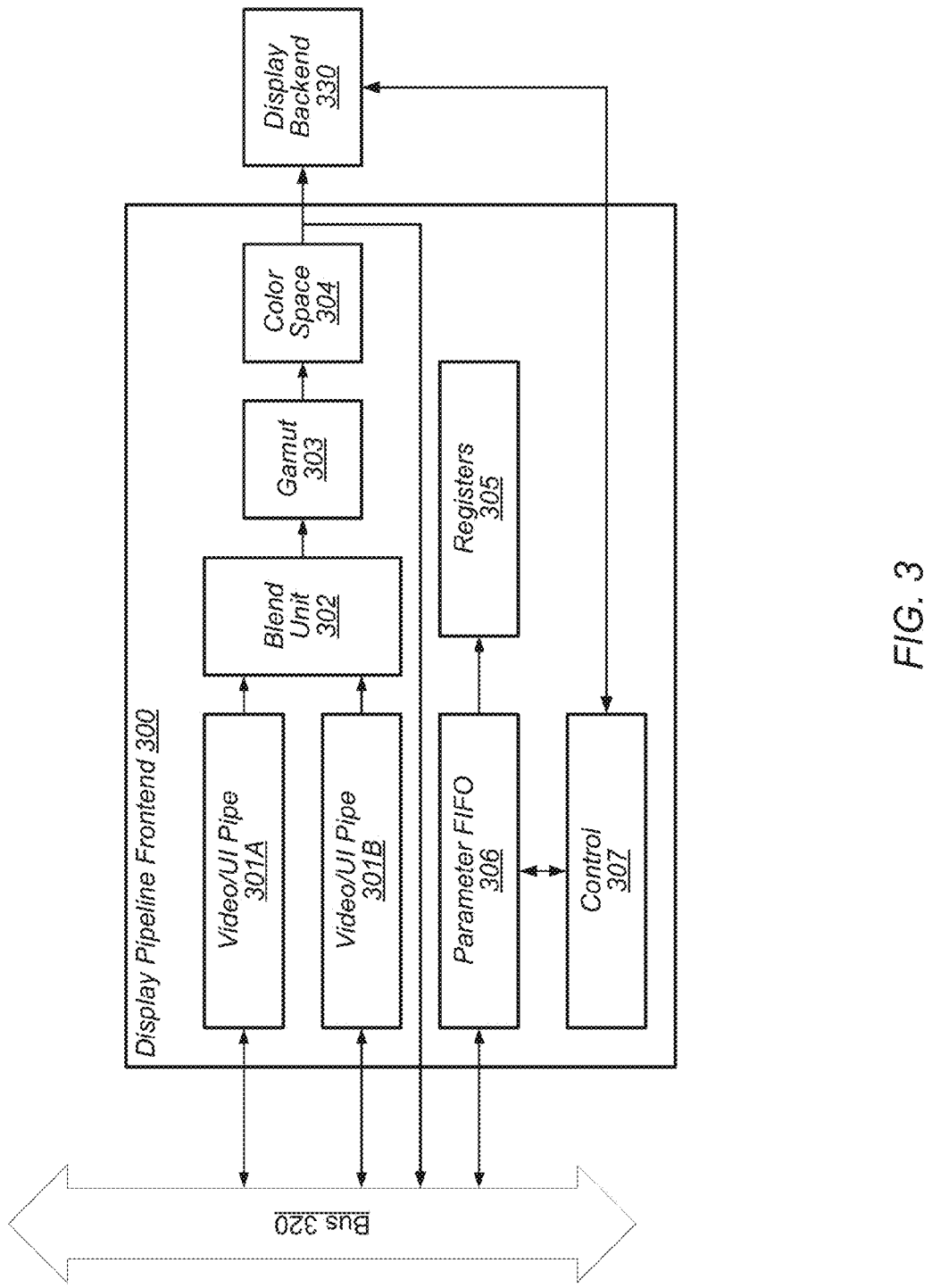
FIG. 3 is a block diagram illustrating one embodiment of a display pipeline frontend.

Referring now to FIG. 3, a block diagram of one embodiment of a display pipeline frontend 300 is shown. Display pipeline frontend 300 may represent the frontend portion of display pipes 116 and 117 of FIG. 1. Display pipeline frontend 300 may be coupled to a system bus 320 and to a display backend 330. In some embodiments, display backend 330 may directly interface to the display to display pixels generated by display pipeline frontend 300. Display pipeline frontend 300 may include functional sub-blocks such as one or more video/user interface (UI) pipelines 301A-B, blend unit 302, gamut adjustment block 303, color space converter 304, registers 305, parameter First-In First-Out buffer (FIFO) 306, and control unit 307. Display pipeline frontend 300 may also include other components which are not shown in FIG. 3 to avoid cluttering the figure.

System bus 320, in some embodiments, may correspond to communication fabric 127 from FIG. 1. System bus 320 couples various functional blocks such that the functional blocks may pass data between one another. Display pipeline frontend 300 may be coupled to system bus 320 in order to receive video frame data for processing. In some embodiments, display pipeline frontend 300 may also send processed video frames to other functional blocks and/or memory that may also be coupled to system bus 320. It is to be understood that when the term "video frame" is used, this is intended to represent any type of frame, such as an image, that can be rendered to the display.

The display pipeline frontend 300 may include one or more video/UI pipelines 301A-B, each of which may be a video and/or user interface (UI) pipeline depending on the embodiment. It is noted that the terms "video/UI pipeline"

and "pixel processing pipeline" may be used interchangeably herein. In other embodiments, display pipeline frontend 300 may have one or more dedicated video pipelines and/or one or more dedicated UI pipelines. Each video/UI pipeline 301 may fetch a source image (or a portion of a source image) from a buffer coupled to system bus 320. The buffered source image may reside in a system memory such as, for example, system memory 112 from FIG. 1. Each video/UI pipeline 301 may fetch a distinct source image (or a portion of a distinct source image) and may process the source image in various ways, including, but not limited to, format conversion (e.g., YCbCr to ARGB), image scaling, and dithering. In some embodiments, each video/UI pipeline may process one pixel at a time, in a specific order from the source image, outputting a stream of pixel data, and maintaining the same order as pixel data passes through.

In one embodiment, when utilized as a user interface pipeline, a given video/UI pipeline 301 may support programmable active regions in the source image. The active regions may define the only portions of the source image to be displayed. In an embodiment, the given video/UI pipeline 301 may be configured to only fetch data within the active regions. Outside of the active regions, dummy data with an alpha value of zero may be passed as the pixel data.

Control unit 307 may, in various embodiments, be configured to arbitrate read requests to fetch data from memory from video/UI pipelines 301A-B. In some embodiments, the read requests may point to a virtual address. A memory management unit (not shown) may convert the virtual address to a physical address in memory prior to the requests being presented to the memory. In some embodiments, control unit 307 may include a dedicated state machine or sequential logic circuit. A general purpose processor executing program instructions stored in memory may, in other embodiments, be employed to perform the functions of control unit 307.

Blending unit 302 may receive a pixel stream from one or more of video/UI pipelines 301A-B. If only one pixel stream is received, blending unit 302 may simply pass the stream through to the next sub-block. However, if more than one pixel stream is received, blending unit 302 may blend the pixel colors together to create an image to be displayed. In various embodiments, blending unit 302 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 302 to adjust the appearance of the browser window based on the color and transparency of the calendar reminder. The output of blending unit 302 may be a single pixel stream composite of the one or more input pixel streams.

The output of blending unit 302 may be sent to gamut adjustment unit 303. Gamut adjustment 303 may adjust the color mapping of the output of blending unit 302 to better match the available color of the intended target display. The output of gamut adjustment unit 303 may be sent to color space converter 304. Color space converter 304 may take the pixel stream output from gamut adjustment unit 303 and convert it to a new color space. Color space converter 304 may then send the pixel stream to display backend 330 or back onto system bus 320. In other embodiments, the pixel stream may be sent to other target destinations. For example, the pixel stream may be sent to a network interface for example. In some embodiments, a new color space may be chosen based on the mix of colors after blending and gamut corrections have been applied. In further embodiments, the color space may be changed based on the intended target display.

Display backend 330 may control the display to display the pixels generated by display pipeline frontend 300. Display backend 330 may read pixels at a regular rate from an output FIFO (not shown) of display pipeline frontend 300 according to a pixel clock. The rate may depend on the resolution of the display as well as the refresh rate of the display. For example, a display having a resolution of N×M and a refresh rate of R frames per second may have a pixel clock frequency based on N×M×R. On the other hand, the output FIFO may be written to as pixels are generated by display pipeline frontend 300.

Display backend 330 may receive processed image data as each pixel is processed by display pipeline frontend 300. Display backend 330 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display backend 330.

The parameters that display pipeline frontend 300 may use to control how the various sub-blocks manipulate the video frame may be stored in control registers 305. These registers may include, but are not limited to, setting input and output frame sizes, setting input and output pixel formats, location of the source frames, and destination of the output (display backend 330 or system bus 320). Control registers 305 may be loaded by parameter FIFO 306.

Parameter FIFO 306 may be loaded by a host processor, a direct memory access unit, a graphics processing unit, or any other suitable processor within the computing system. In other embodiments, parameter FIFO 306 may directly fetch values from a system memory, such as, for example, system memory 112 in FIG. 1. Parameter FIFO 306 may be configured to update control registers 305 of display pipeline frontend 300 before each source video frame is fetched. In some embodiments, parameter FIFO may update all control registers 305 for each frame. In other embodiments, parameter FIFO may be configured to update subsets of control registers 305 including all or none for each frame. A FIFO as used and described herein, may refer to a memory storage buffer in which data stored in the buffer is read in the same order it was written. A FIFO may be comprised of RAM or registers and may utilize pointers to the first and last entries in the FIFO.

While processing a given source video frame, control unit 307 may determine if the configuration data needed for processing the next source video frame has already been received. The configuration data may be referred to as a "frame packet" for the purposes of this discussion. Control unit 307 may be configured to send an indication to display backend 330 when the next frame packet corresponding to the next source video frame has been received by parameter FIFO 306. Display backend 330 may be configured to generate and convey a regular VBI signal to display pipeline frontend 300 (and to the other display pipeline frontends) if all display pipeline frontends have received the next frame packet corresponding to the next source video frame. Alternatively, if any of the display pipeline frontends have not received the next frame packet, then the display backend 330 may generate and convey a repeat VBI signal to display pipeline frontend 300 and to the other display pipeline frontends.

It is noted that the display pipeline frontend 300 illustrated in FIG. 3 is merely an example. In other embodiments, different functional blocks and different configurations of functional blocks may be possible depending on the specific application for which the display pipeline is intended. For example, more than two video/UI pipelines may be included within a display pipeline frontend in other embodiments.

Figure 4:
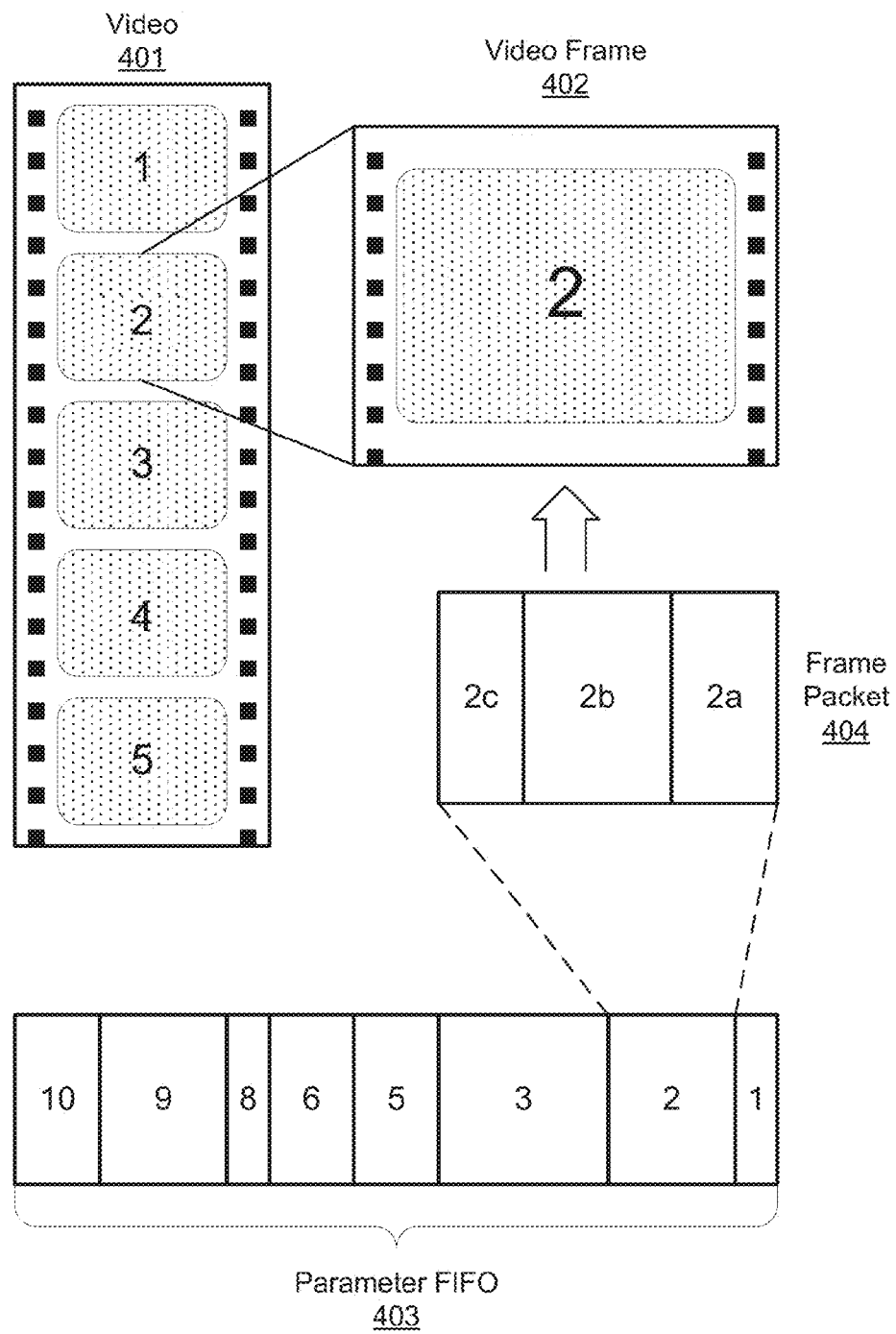
FIG. 4 is a block diagram illustrating one embodiment of a representation of a video file and a corresponding parameter FIFO.

Turning now to FIG. 4, a representation of a video file and a corresponding parameter FIFO are shown. In various embodiments, video 401 may represent a file containing a video clip in a format, such as, for example, Moving Pictures Expert Group-4 Part 14 (MP4), Advanced Video Coding (H.264/AVC), or Audio Video Interleave (AVI). Alternatively, Video 401 may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG). For demonstration purposes, Video 401 is illustrated with five frames, numbered 1 through 5. However, any number of frames may be included in Video 401.

Video frame 402 may represent a single frame from video 401. In this example, video frame 402 is illustrated as frame number 2 of video 401. Video frame 402 may be a single image, in any of the formats previously discussed or any other suitable format. Video frame 402 may contain a list of pixel information in ARGB, YCbCr, or other suitable pixel format.

Parameter FIFO 403 may correspond to parameter FIFO 306 as illustrated in FIG. 3 and may have functionality as previously described. For demonstration purposes, parameter FIFO 403 is illustrated in FIG. 4 as holding eight frame packets, numbered 1 through 10, with 4 and 7 excluded. However, parameter FIFO 403 may hold as many frame packets as allowed by the size of the FIFO and the size of the frame packets. The number of the frame packet may correspond to the number of the video frame of video 401 for which the packet is intended to be used. Frame packets 4 and 7 (not shown) are excluded to illustrate that some video frames may not require a frame packet. In other embodiments, a frame packet may be required for each video frame. The size of each of the frame packets is shown to vary among the 10 examples to illustrate that the sizes may differ from frame packet to frame packet. In other embodiments, each frame packet may be a standard consistent size.

Frame packet 404 may represent a single frame packet stored in Parameter FIFO 403. Frame packet 404 may contain settings for various registers associated with a given video frame. In this example, frame packet 404 is shown as number 2 which may correspond to video frame 402, also illustrated as number 2. Frame packet 404 is illustrated as being divided into three sections, labeled 2a, 2b, and 2c, each representing one parameter command. A given frame packet may include any number of parameter commands, from zero to as many as may be stored in parameter FIFO 403. Each parameter command 2a-2c may contain a setting for one or more registers associated with video frame 402. Parameter commands 2a-2c may be of various lengths, based on the number of settings included in each command. In other embodiments, parameter commands 2a-2c may be standardized to one or more specific lengths.

In a system such as SOC 110 in FIG. 1, display pipes 116 and 117 may process respective portions of video frame 402 and frame packet 404 such that parameter commands 2a-2c are executed after video frame 1 of video 401 has been displayed and before video frame 402, is displayed, such that video frame 402 is displayed with parameters corresponding to parameter commands 2a-2c. These parameters may remain at their set values until another parameter command is executed that changes their currently set value. In some embodiments, the values of some or all parameters may be modified by commands not associated with parameter FIFO 403, such as, for example, operations transmitted by processor 114 of FIG. 1.

Figure 5:
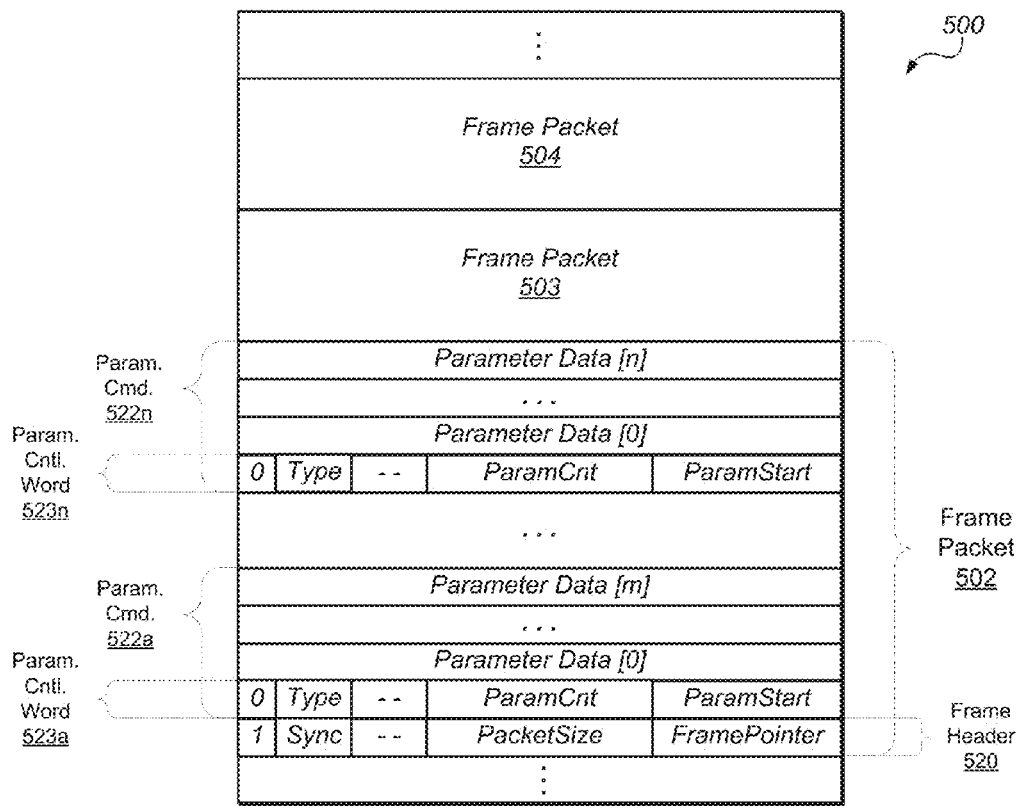
FIG. 5 is a block diagram illustrating one embodiment of parameter FIFO entries.

Referring now to FIG. 5, one embodiment of parameter FIFO entries 500 are shown. FIG. 5 illustrates the entries in a parameter FIFO, such as parameter FIFO 403 in FIG. 4. Parameter FIFO entries 500 may include several frame packets, as illustrated by frame packets 502, 503, and 504.

Frame packet 502 may, in some embodiments, include frame header 520 and be followed by a number of parameter commands, such as parameter command 522a through parameter command 522n as depicted in FIG. 5. A given frame packet may contain zero parameter commands up to the maximum number of commands that may fit into a FIFO of a given size. A frame packet with zero parameter commands may be referred to as a null parameter setting. Frame packet 502 may be read from parameter FIFO 403 when all frame packets written to parameter FIFO 403 before frame packet 502 have been read. When frame packet 502 is read, the first word read may be frame header 520.

Frame header 520 may contain information regarding the structure of frame packet 502. For example, frame header 520 may include a value corresponding to the size of frame packet 502. In some embodiments, the size may represent the number of bytes or words in the frame packet 502 and, in other embodiments, the size may represent the number of parameter commands. Frame header 520 may also include a value corresponding to the video frame for which it is intended. In various embodiments, frame header 520 may include a value to indicate that it is a frame header and/or a value to indicate frame packet 520 should be used with the next video frame to be processed rather than a specific video frame. This last feature may be useful in cases where a user adjusts a setting while a video is playing or an image is being displayed. For example, a user may change a brightness setting or a zoom factor with an expectation of the change being implemented as soon as possible rather than at a specific video frame.

Frame packet 502 may include zero or more parameter commands 522a-n. In some embodiments, a given parameter command, such as, for example, parameter command 522a, may include one parameter control word 523a. The parameter control word may define the structure of parameter command 522a. For example, parameter control word 523a may include a parameter count value to indicate how many parameter settings are included in the command. Parameter control word 523a may also include a parameter start value to indicate a starting register address for the parameter settings to be written. Some embodiments may also include a type value to indicate if parameter command 522a is internal, i.e., intended for registers within the display pipeline, such as display pipeline 116, or external, i.e., intended for registers outside display pipeline 116. In some embodiments, the parameter start value may only be used for internal parameter commands, where the registers may be addressed with an address value smaller than a complete data word. In such embodiments, external commands may use the first one or more words of the parameter data to form a starting address for the register(s) to be written with the remaining parameter data.

Each parameter setting within parameter command 522a may include one or more words of parameter data, shown in FIG. 5 as parameter data [0] through parameter data [m]. The number of parameter data words included in parameter command 522a may depend on the type of parameter command, internal or external, and the number of registers to be written by parameter command 522a. In various embodiments, parameter commands 522 may include various numbers of parameter data or may be standardized to a specific number of parameter data.

It is noted that the descriptions of frame packets, video frames and the parameter FIFO in FIG. 4 and FIG. 5 are merely examples. In other embodiments, the structure of a frame packet may include multiple words for header rather than the single word illustrated in FIG. 5, and a header may not be the first word within a given frame packet. In various embodiments, frame packets and parameter commands may be of a fixed length rather than various lengths as illustrated in FIGS. 4 and 5.

Figure 6:
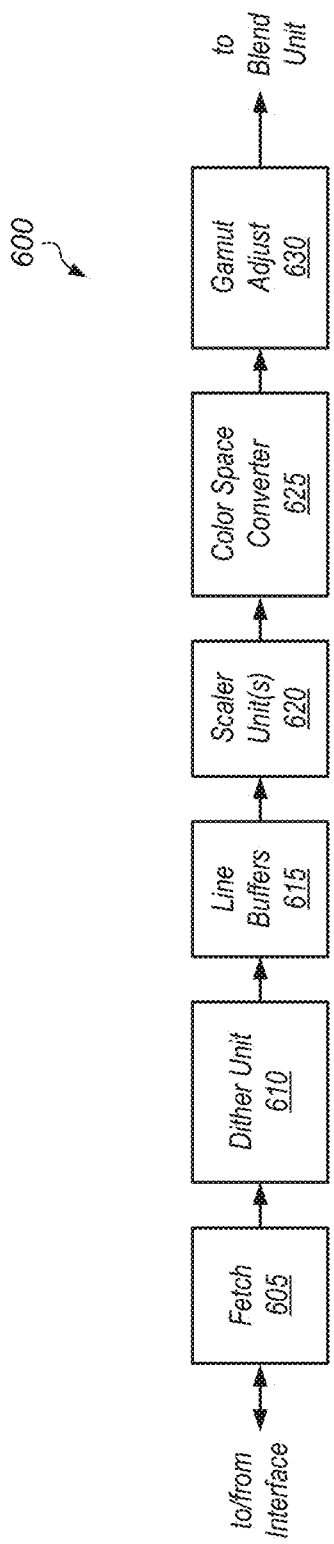
FIG. 6 is a block diagram illustrating one embodiment of a video/UI pipeline.

Referring to FIG. 6, a block diagram of one embodiment of a video/UI pipeline 600 is shown. Video/UI pipeline 600 may correspond to video/UI pipelines 301A and 301B of display pipeline 300 as illustrated in FIG. 3. In the illustrated embodiment, video/UI pipeline 600 includes fetch unit 605, dither unit 610, line buffers 615, scaler unit(s) 620, color space converter 625, and gamut adjust unit 630. In general, video/UI pipeline 600 may be responsible for fetching pixel data for source frames stored in a memory, and then processing the fetched data before sending the processed data to a blend unit, such as, blend unit 302 of display pipeline frontend 300 as illustrated in FIG. 3.

Fetch unit 605 may be configured to generate read requests for source pixel data needed by the requestor(s) of video/UI pipeline 600. Fetching the source lines from the source buffer is commonly referred to as a "pass" of the source buffer. During each pass of the source buffer, required portions or blocks of data may be fetched from top to bottom, then from left to right, where "top," "bottom," "left," and "right" are in reference to a display. In other embodiments, passes of the source buffer may proceed differently.

Each read request may include one or more addresses indicating where the portion of data is stored in memory. In some embodiments, address information included in the read requests may be directed towards a virtual (also referred to herein as "logical") address space, wherein addresses do not directly point to physical locations within a memory device. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display pipeline frontend, while in other embodiments, the memory management unit may be located elsewhere within a computing system.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Dither unit 610 may, in various embodiments, provide structured noise dithering on the Luma channel of YCbCr formatted data. Other channels, such as the chroma channels of YCbCr, and other formats, such as ARGB may not be dithered.

Line buffers 615 may be configured to store the incoming frame data corresponding to row lines of a respective display screen. The frame data may be indicative of luminance and chrominance of individual pixels included within the row lines. Line buffers 615 may be designed in accordance with one of various design styles. For example, line buffers 615 may be SRAM, DRAM, or any other suitable memory type. In some embodiments, line buffers 615 may include a single input/output port, while, in other embodiments, line buffers 615 may have multiple data input/output ports.

In some embodiments, scaling of source pixels may be performed in two steps. The first step may perform a vertical scaling, and the second step may perform a horizontal scaling. In the illustrated embodiment, scaler unit(s) 620 may perform the vertical and horizontal scaling. Scaler unit(s) 620 may be designed according to one of varying design styles. In some embodiments, the vertical scaler and horizontal scaler of scaler unit(s) 620 may be implemented as 9-tap 32-phase filters. These multi-phase filters may, in various embodiments, multiply each pixel retrieved by fetch unit 605 by a weighting factor. The resultant pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

In some embodiments, the scale position value (also referred to herein as the "display position value"), may included multiple portions. For example, the scale position value may include an integer portion and a fractional portion. In some embodiments, the determination of which pixels to scale may depend on the integer portion of the scale position value, and the selecting of weighting factors may depend on the fractional portion of the scale position value. In some embodiments, a Digital Differential Analyzer (DDA) may be used to determine the scale position value.

Color management within video/UI pipeline 600 may be performed by color space converter 625 and gamut adjust unit 630. In some embodiments, color space converter 625 may be configured to convert YCbCr source data to the RGB format. Alternatively, color space converter may be configured to remove offsets from source data in the RGB format. Color space converter 625 may, in various embodiments, include a variety of functional blocks, such as an input offset unit, a matrix multiplier, and an output offset unit (all not shown). The use of such blocks may allow the conversion from YCbCr format to RGB format and vice-versa.

In various embodiments, gamut adjust unit 630 may be configured to convert pixels from a non-linear color space to a linear color space, and vice-versa. In some embodiments, gamut adjust unit 630 may include a Look Up Table (LUT) and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. For example, separate LUTs may be used for Gamma and De-Gamma calculations.

It is note that the embodiment illustrated in FIG. 6 is merely an example. In other embodiments, different functional blocks and different configurations of functional blocks are possible and contemplated.

Figure 7:
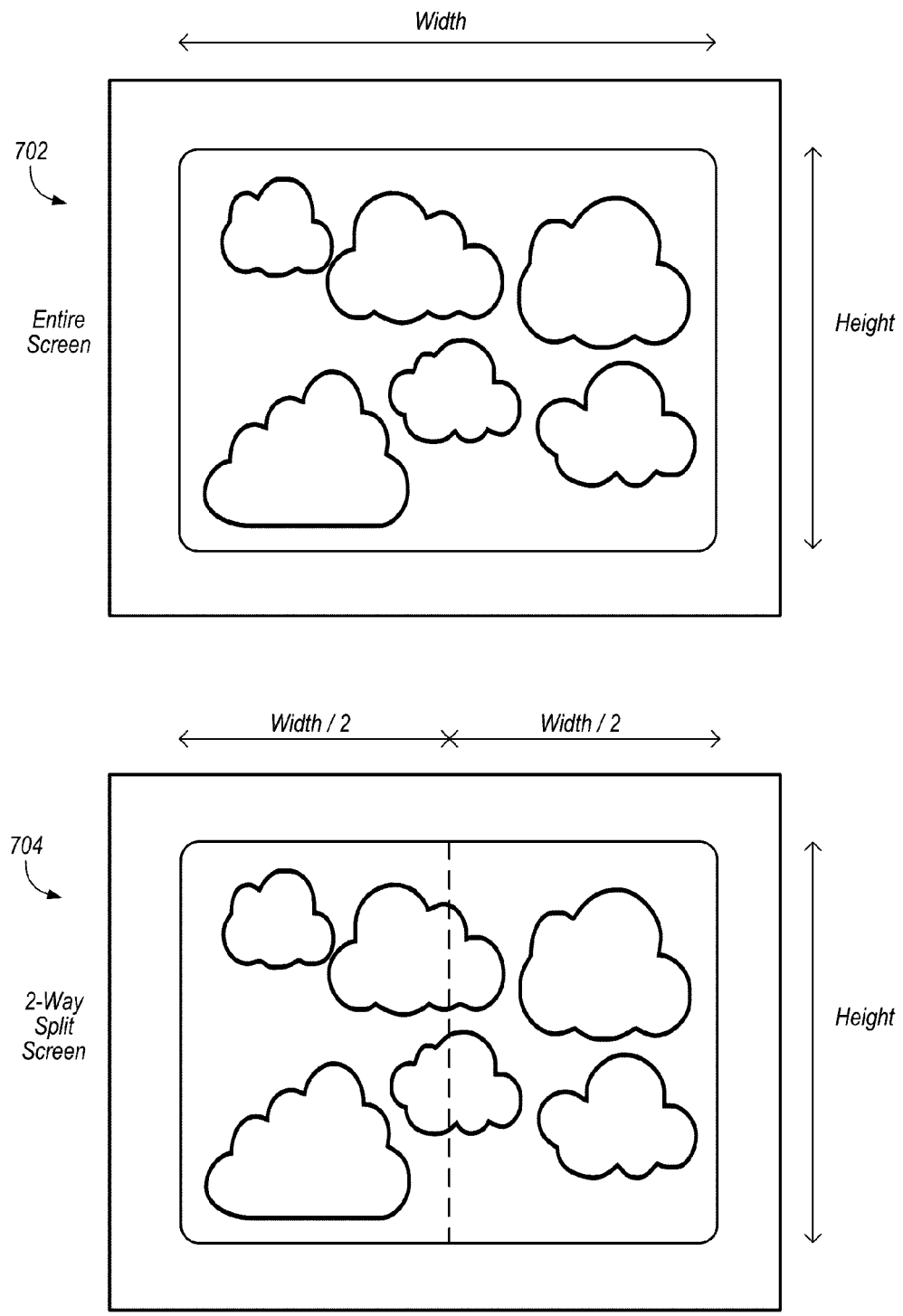
FIG. 7 is a block diagram illustrating a non-split display screen and a two-way split display screen.

Referring now to FIG. 7, a block diagram of a non-split display screen and a two-way split display screen is shown. Screen 702 is shown at the top of FIG. 7, and screen 702 represents the scenario where a screen is not logically partitioned. In contrast, screen 704 is the same size as screen 702, but screen 704 is logically partitioned into two portions. The partitioning may be performed by splitting the screen into the left half and the right half, with the partitioning occurring down the middle from top to bottom of the screen. In other embodiments, the screen may be partitioned differently and/or into more than two portions. For example, in another embodiment, the screen may be partitioned horizontally into a top half and bottom half.

In one embodiment, an entire video frame may be displayed on screen 704 using two display pipelines and appear the same as the entire video frame being displayed on screen 702 using a single display pipeline. The video frame is shown as a cluster of clouds in screens 702 and 704 to illustrate an example of a frame from the scene of a television show, movie, or other sequence of images. The difference for screen 704 (as compared to screen 702) is that a first display pipeline would be driving the left side of the video frame to the display and a second display pipeline would be driving the right side of the video frame to the display. The first display pipeline would continue driving the left side of the video frame and the second display pipeline would continue driving the right side of the video frame to screen 704 for each video frame in the sequence of video frames corresponding to a video being displayed on screen 704. In contrast, a single display pipeline would be driving the entire video frame to the display for screen 702 for each video frame in the sequence of video frames.

Figure 8:
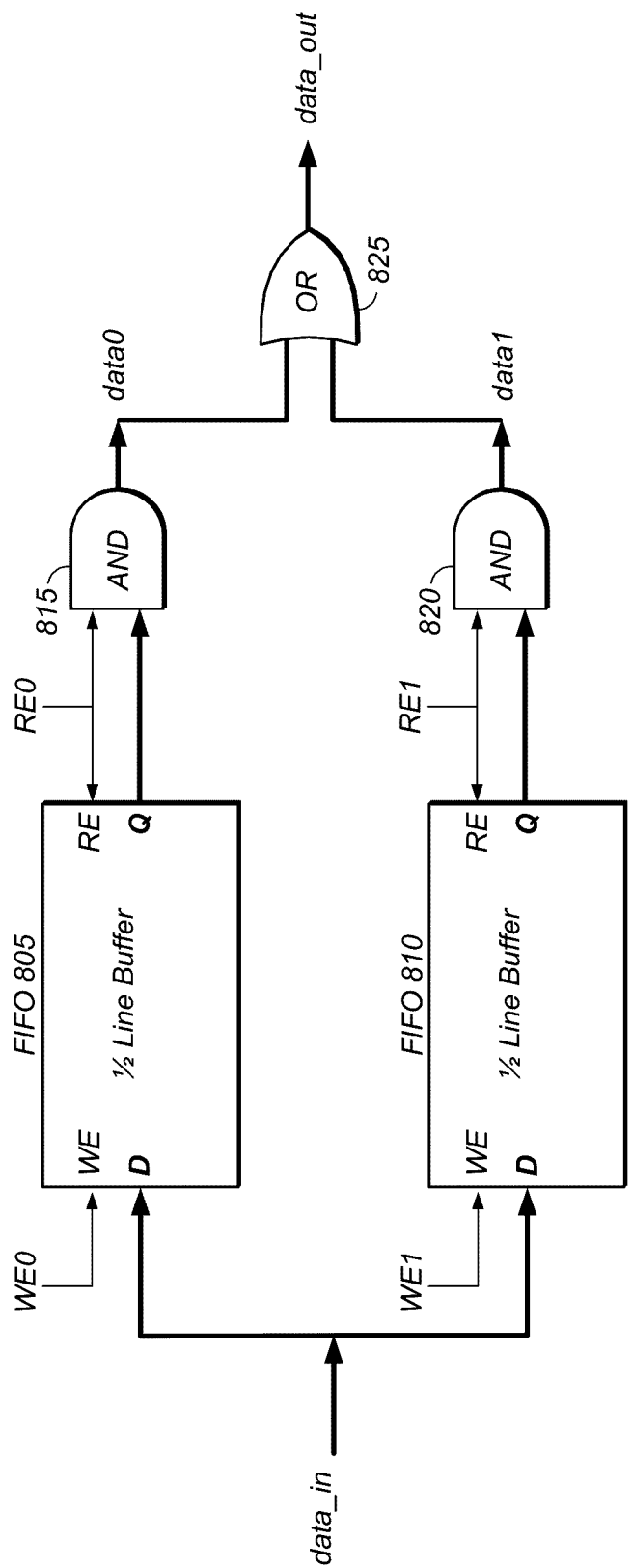
FIG. 8 is a block diagram illustrating one embodiment of circuitry for enabling a two-way display split.

Turning now to FIG. 8, a block diagram of one embodiment of circuitry for enabling a two-way display split is shown. In one embodiment, line buffers may be utilized at the output of the display backend (not shown). For example, in one embodiment, the output from display pipelines 210 and 240 of FIG. 2 may be conveyed to the input (or data_in) of the circuitry in FIG. 8. Pixels may be written sequentially into first-in first-out buffer (FIFO) 805 and FIFO 810. Each FIFO 805 and 810 may be configured to store half of a line of the video frame, which corresponds to a full line of either half of the video frame. In one embodiment, the pixel output (or data_in) of the circuitry in FIG. 8 may be conveyed to a virtual single controller (e.g., virtual single controller 1000 of FIG. 10).

The pixel write sequence may be controlled by write enable 0 (WE0) and write enable 1 (WE1). Read enable 0 (RE0) and read enable 1 (RE1) may control the pixels read out of the FIFOs through AND gates 815 and 820, respectively, and through OR gate 825 to the data_out bus. Since the peak bandwidth in the split display case is the same constant bandwidth as in the non-split display case, the data_out bus may have the same width and run at the same clock rate as the data in bus.

Figure 9:
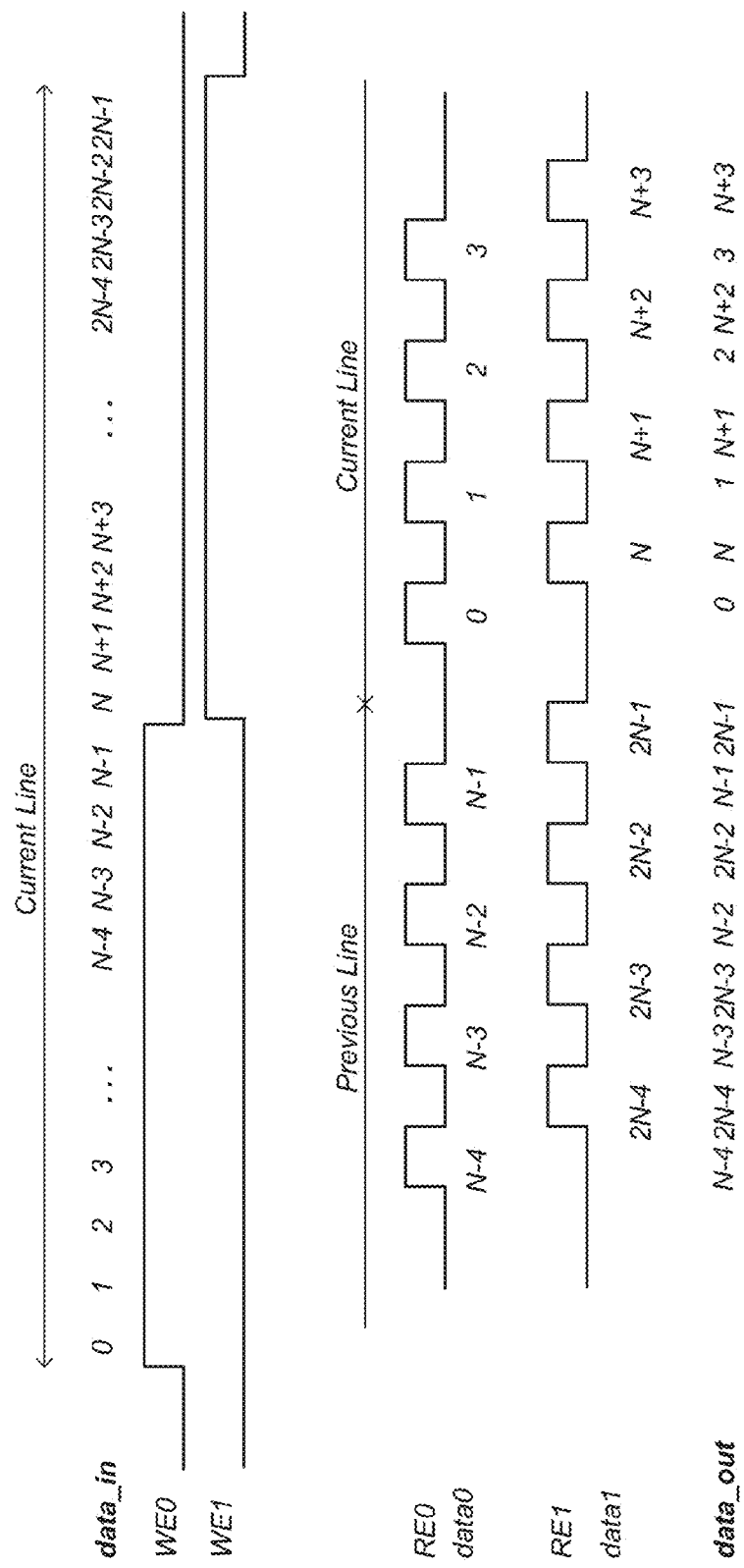
FIG. 9 is a timing diagram of circuitry for enabling a two-way display split.

Referring now to FIG. 9, a timing diagram of one embodiment of circuitry for enabling a two-way display split is shown. The timing diagram is based on the circuit diagram shown in FIG. 8. For the purposes of this discussion, the number of pixels per line (of the entire display) is assumed to be 2*N, wherein N is a positive integer.

In one embodiment, during the first half of the line, pixels 0 through (N−1) may be written into FIFO 805. During the second half of the line, pixels N through (2N−1) may be written into FIFO 810. After a latency of half a line, the pixels 0 through (N−1) stored in FIFO 805 and pixels N through (2N−1) stored in FIFO 810 may be read in parallel and output in an interleaved fashion.

Turning now to FIG. 10, a block diagram of one embodiment of a virtual single controller 1000. Virtual single controller 1000 may be configured to control one or more displays in at least three different scenarios for a computing system with two display pipelines. A first scenario involves having a first display pipeline drive an entire display. A second scenario involves having a second display pipeline drive an entire display. A third scenario involves having two display pipelines driving separate portions of a split display.

In one embodiment, for a split display scenario, virtual single controller 1000 may be configured as a dual-controller. In this embodiment, pixel de-interleaver 1006 may be configured to de-interleave the received pixel data. The outputs of pixel de-interleaver 1006 may be conveyed to multiplexers (muxes) 1010 and 1012. Muxes 1010 and 1012 may be controlled via a dual pipe mode signal. The dual pipe mode signal may select the mode of operation (single display or split display) for virtual single controller 1000. The de-interleaved pixel data may then be sent to controllers 1014 and 1016.

The pixel clock may be coupled to an input of mux 1008 and to clock divider 1004 which may be configured to divide the pixel clock by two. The output of clock divider 1004 may be coupled to an input of mux 1008, and the dual pipe mode signal may be the select signal for mux 1008. The selected clock from the output of mux 1008 may then be coupled to controllers 1014 and 1016. When in split-display mode, controllers 1014 and 1016 may output pixels on two lanes (for four-lane operation) or on one lane (for two-lane operation).

Mux 1018 may be configured to select which controller drives the display in scenarios where a single controller drives the entire display. The output of mux 1018 is coupled to mux 1020, and mux 1020 may be configured to select dual pipe mode (for a split display) or single pipe mode when a single controller is driving the entire display. The output of mux 1020 may be coupled to the four lanes of interface 1022. Interface 1022 may be coupled to the display (not shown).

In one embodiment, while in split display mode, each controller 1014 and 1016 may run at half the video clock rate, and half of the pixels per line of the video frame may pass through each controller 1014 and 1016. In dual controller mode, the horizontal video format timing parameters may be programmed to half of their values used for single controller mode. The vertical video format timing parameters may not be affected by the display split and may run at the normal clock rate.

Figure 11:
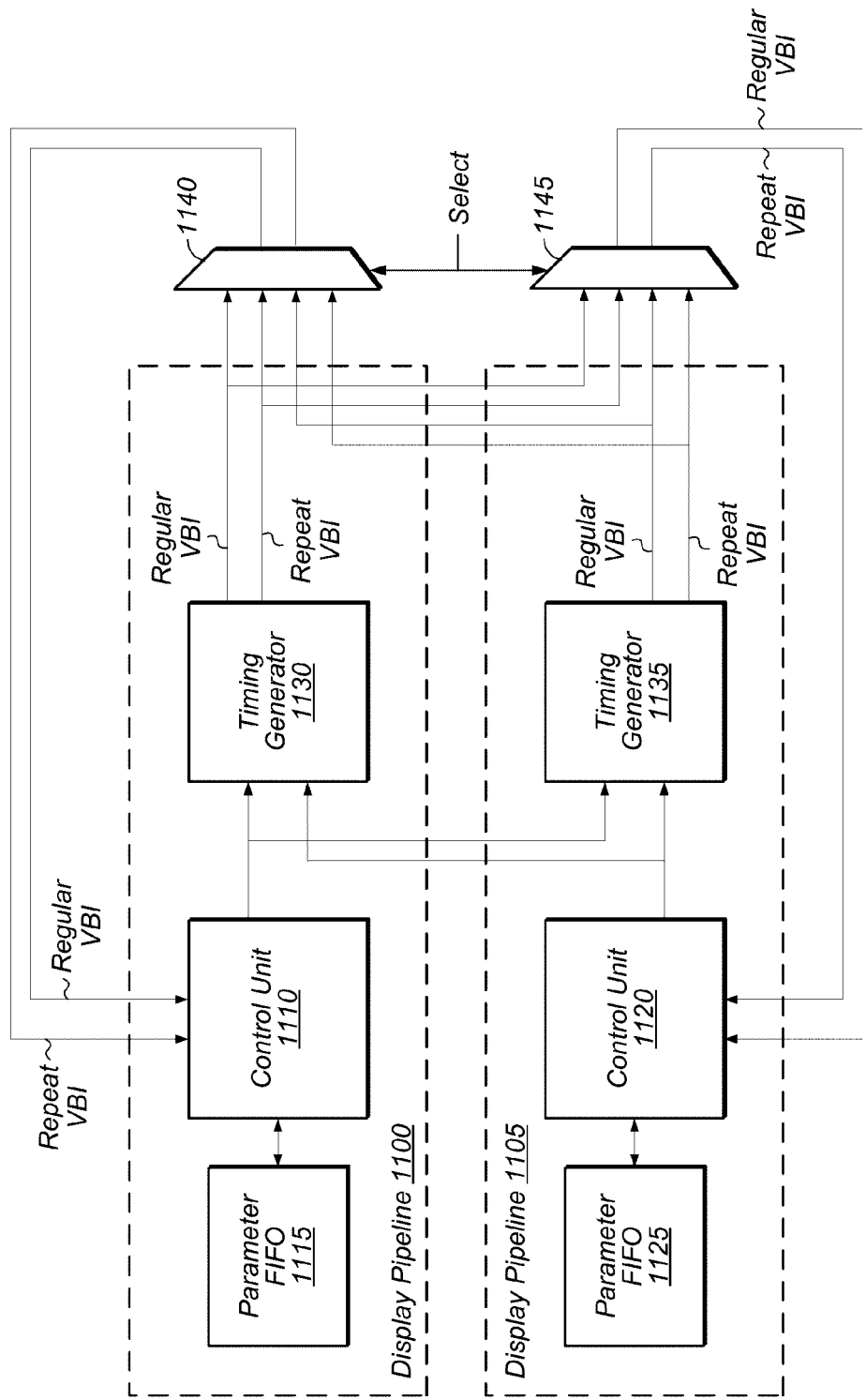
FIG. 11 is a block diagram illustrating one embodiment of control logic for synchronizing two display pipelines.

Turning now to FIG. 11, one embodiment of control logic for synchronizing two display pipelines is shown. Utilizing two display pipelines to drive a single display may present various challenges related to keeping the two display pipelines synchronized to the same frame. For example, in one embodiment, each display pipeline may be working on a given frame, and the configuration data (i.e., frame packet) for the next frame may be sent to the two display pipelines close in proximity to the frame boundary between the current frame and the next frame. Therefore, in some cases, one of the display pipelines may receive the configuration data for the next frame in time to process the next frame while the other display pipeline may not receive the configuration data in time. When this case arises, and if the techniques disclosed herein are not employed, one display pipeline might draw the wrong half of the frame to the display, and the two halves of the video frame driven to the display may appear significantly different, especially when a change of scene takes place in the video sequence from the current frame to the next frame.

To prevent the above scenario from occurring, different types of vertical blanking interval (VBI) signals may be generated based on whether selected display pipelines have received the next frame packet in time to process the next frame. A first type of VBI signal may be referred to as the "regular VBI" signal, and this regular VBI signal may be sent when each display pipeline has already received all of the configuration data for the next frame. A second type of VBI signal may be referred to as the "repeat VBI" signal, and the repeat VBI signal may be sent when either of the display pipelines has not yet received all of the configuration data for the next frame.

As shown in FIG. 11, there are two display pipelines 1100 and 1105. Display pipeline 1100 includes control unit 1110, parameter FIFO 1115, and timing generator 1130. Display pipeline 1100 may also include other logic which is not shown in FIG. 11 to avoid cluttering the figure. Control unit 1110 may be configured to determine if parameter FIFO 1115 has received the frame packet for the next frame. When control unit 1110 has detected that parameter FIFO 1115 has received the frame packet for the next frame, then control unit 1110 may send a corresponding indication to timing generators 1130 and 1135. Similarly, display pipeline 1105 includes control unit 1120, parameter FIFO 1125, and timing generator 1135. When control unit 1120 has detected that parameter FIFO 1125 has received the frame packet for the next frame, then control unit 1120 may send an indication to timing generators 1130 and 1135.

In one embodiment, either of the timing generators 1130 and 1135 may be selected as the master timing generator for a given split-display scenario. In another embodiment, only one of timing generators 1130 and 1135 may be capable of being the master timing generator. For the embodiment where either timing generator 1130 or timing generator 1135 may be the master timing generator, software executing on a processor on the host device may be configured to select which timing generator is the master. This signal may be conveyed to muxes 1140 and 1145 to determine which timing generator will drive the regular VBI signal or repeat VBI signal to both display pipelines 1100 and 1105 for each frame. In various embodiments, the select signal conveyed to muxes 1140 and 1145 may or may not be the same. In an embodiment not using a split-display, each of display pipelines 1100 and 1105 may drive a separate display, and timing generators 1130 and 1135 may operate independently of each other. It is noted that in some embodiments, there may only be one timing generator for both display pipelines. In such a case, this timing generator is always the master timing generator for both pipelines.

In one embodiment, each timing generator 1130 and 1135 may generate either a regular VBI or repeat VBI signal based on the state of the indications from both display pipelines 1100 and 1105 at a specific point in time. Both display pipelines 1100 and 1105 may be configured to look at and utilize only one of the Regular/Repeat VBI signal pairs when determining which frame to process next, with both display pipelines 1100 and 1105 looking at the same Regular/Repeat VBI signal pair.

Figure 12:
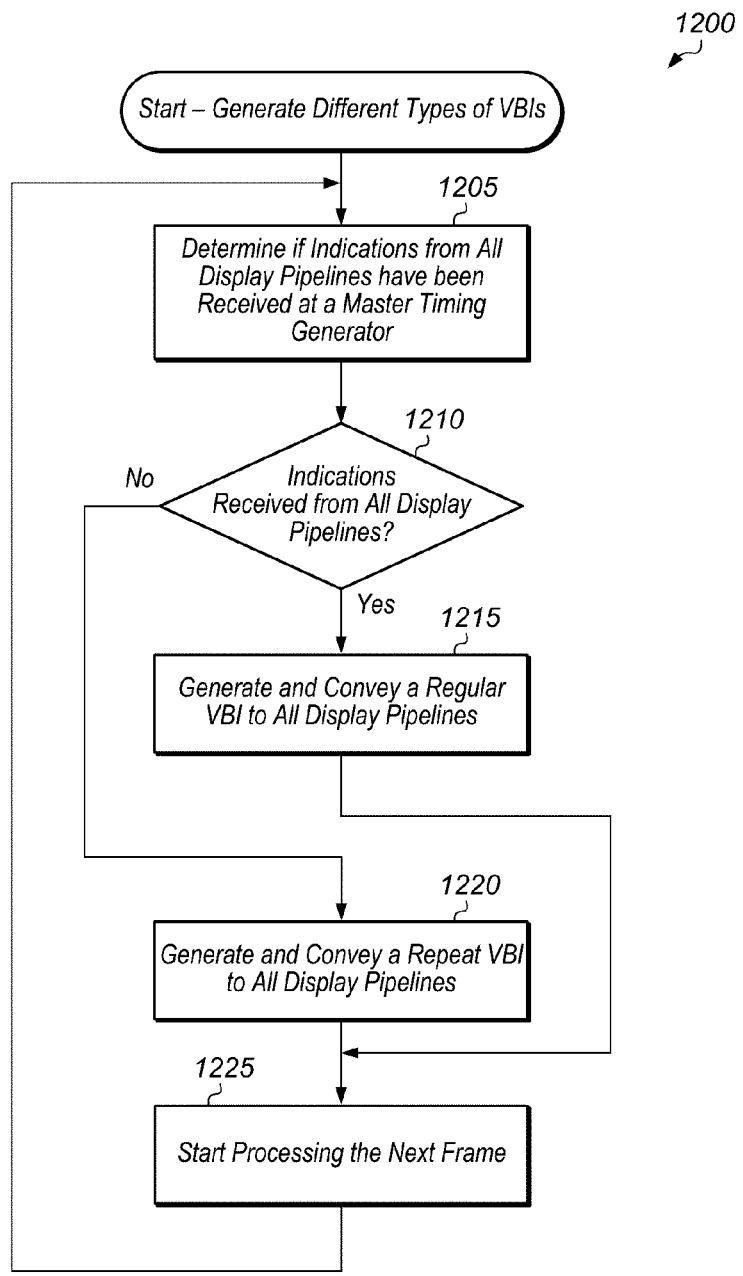
FIG. 12 is a generalized flow diagram illustrating one embodiment of a method for generating different types of vertical blanking intervals (VBI) signals.

Referring now to FIG. 12, one embodiment of a method 1200 for generating different types of vertical blanking intervals (VBI) signals is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various display pipelines described herein may be configured to implement method 1200.

A master timing generator of a first display pipeline may determine if it has received indications from all of the display pipelines specifying that they have received the frame packet for the next frame (block 1205). The master timing generator may determine if it has received indications from all of the display pipelines in preparation for generating a VBI signal for the next frame. The current image frame may be displayed on the display of a host device. In one embodiment, the host device may have two display pipelines. In other embodiments, the device may have more than two display pipelines.

If the master timing generator has received indications from all of the display pipelines that they have received the next frame packet (conditional block 1210, "yes" leg), then the master timing generator may generate and convey a regular VBI signal to each of the display pipelines (block 1215). Otherwise, if the master timing generator has not received an indication from at least one display pipeline (conditional block 1210, "no" leg), then the master timing generator may generate and convey a repeat VBI signal to each of the display pipelines (block 1220). After blocks 1215 and 1220, the display pipelines may start processing the next frame (block 1225) and then method 1200 may return to block 1205.

Figure 13:
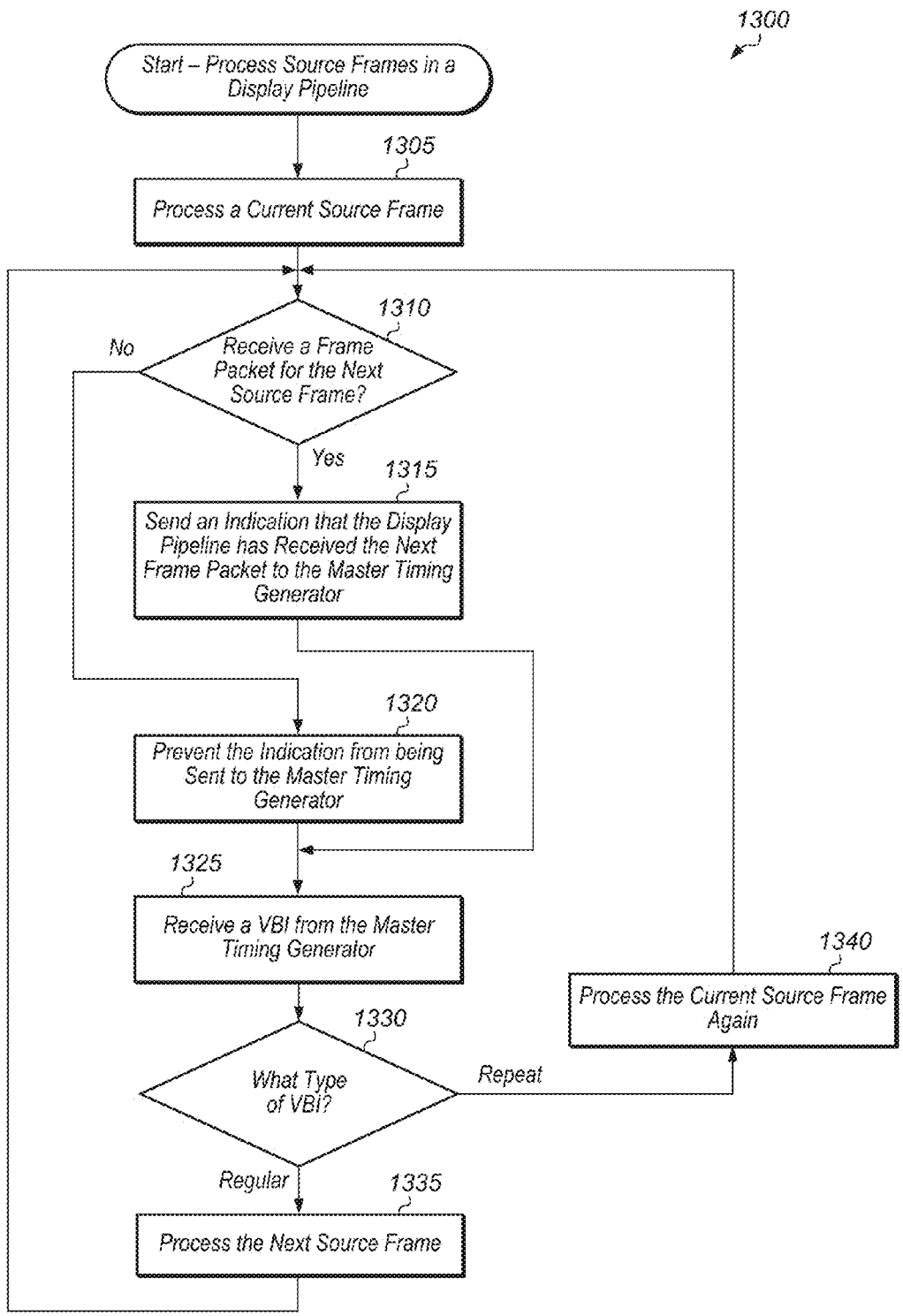
FIG. 13 is a generalized flow diagram illustrating one embodiment of a method for processing source frames in a display pipeline.

Referring now to FIG. 13, one embodiment of a method 1300 for processing source frames in a display pipeline is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various display pipelines described herein may be configured to implement method 1300.

While a display pipeline is processing a current source frame (block 1305), if the display pipeline receives a frame packet with configuration data for the next source frame (conditional block 1310, "yes" leg), then the display pipeline may send an indication that it has received the next frame packet to the master timing generator (block 1315). In some embodiments, the display pipeline may send the indication to more than one timing generator. Additionally, when the device or apparatus has multiple timing generators, one of the timing generators may be selected by software to be the master timing generator. It is noted that the display pipeline may have received the frame packet for the next frame prior to beginning processing of the current frame. In this case, the display pipeline may still send the indication during the current frame. However, in other embodiments, the display pipeline may send the indication immediately upon receipt of the frame packet, regardless of how early (i.e., how many frames ahead of the current frame) the frame packet is received.

If the display pipeline does not receive a frame packet with configuration data for the next source frame (conditional block 1310, "yes" leg), then the display pipeline may prevent the indication from being sent to the master timing generator (block 1320). Next, the display pipeline may receive a VBI signal from the master timing generator (block 1325). If the received VBI signal is the regular VBI signal (conditional block 1330, "regular" leg), then the display pipeline may process the next source frame of the video sequence (block 1335). If the received VBI signal is the repeat VBI signal (conditional block 1330, "repeat" leg), then the display pipeline may drive the current frame again (block 1340). It is noted that, in various embodiments, if a given display pipeline receives the repeat VBI signal, the given display pipeline will process the current frame again even if the given display pipeline already has the frame packet for the next frame. After blocks 1335 and 1340, method 1300 may return to conditional block 1310 to determine if a frame packet with configuration data for the next source frame has been received by the display pipeline.

Figure 14:
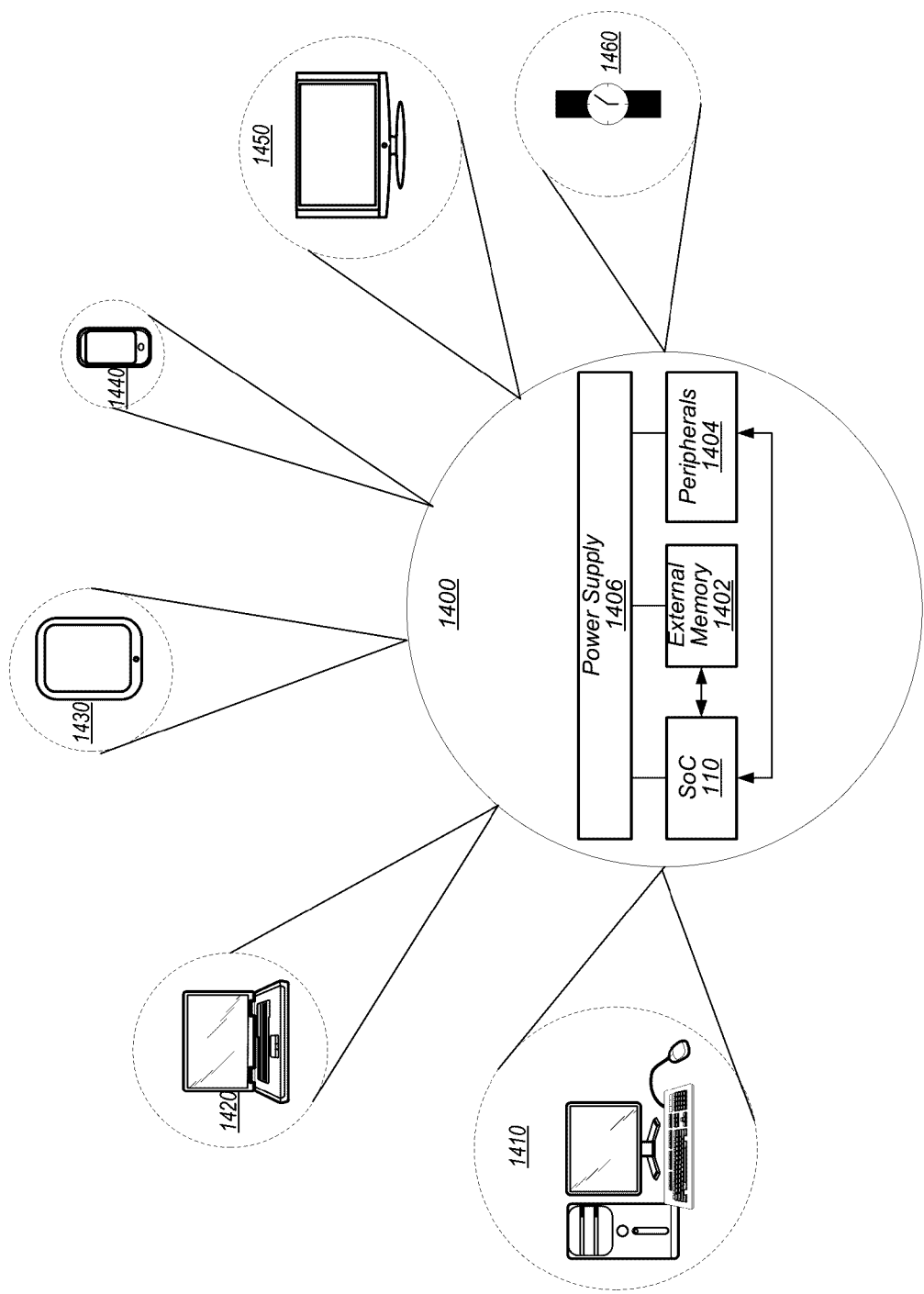
FIG. 14 is a block diagram of one embodiment of a system.

Referring next to FIG. 14, a block diagram of one embodiment of a system 1400 is shown. As shown, system 1400 may represent chip, circuitry, components, etc., of a desktop computer 1410, laptop computer 1420, tablet computer 1430, cell phone 1440, television 1450 (or set top box configured to be coupled to a television), wrist watch or other wearable item 1460, or otherwise. Other devices are possible and are contemplated. In the illustrated embodiment, the system 1400 includes at least one instance of SoC 110 (of FIG. 1) coupled to an external memory 1402.

SoC 110 is coupled to one or more peripherals 1404 and the external memory 1402. A power supply 1406 is also provided which supplies the supply voltages to SoC 110 as well as one or more supply voltages to the memory 1402 and/or the peripherals 1404. In various embodiments, power supply 1406 may represent a battery (e.g., a rechargeable battery in a smart phone, laptop or tablet computer). In some embodiments, more than one instance of SoC 110 may be included (and more than one external memory 1402 may be included as well).

The memory 1402 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 1404 may include any desired circuitry, depending on the type of system 1400. For example, in one embodiment, peripherals 1404 may include devices for various types of wireless communication, such as wifi, Bluetooth, cellular, global positioning system, etc. The peripherals 1404 may also include additional storage, including RAM storage, solid state storage, or disk storage. The peripherals 1404 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first display pipeline configured to drive a first portion of a current frame to a first portion of a display; and
   a second display pipeline configured to drive a second portion of the current frame to a second portion of the display;
   wherein the first display pipeline is configured to:
      receive data corresponding to a next frame;
      receive a regular vertical blanking interval (VBI) signal when both the first display pipeline and the second display pipeline have received configuration data for the next frame;
      receive a repeat VBI signal different from the regular VBI signal when either of the first display pipeline or the second display pipeline has not received configuration data for the next frame; and
      drive the current frame again, responsive to determining the second display pipeline is not ready to drive the next frame, wherein determining the second display pipeline is not ready to drive the next frame comprising detecting the repeat VBI signal.

2. The apparatus as recited in claim 1, wherein the data corresponding to the next frame comprises configuration data.

3. The apparatus as recited in claim 2, wherein the second display pipeline is not ready to drive the next frame if it has not received configuration data for the next frame.

4. The apparatus as recited in claim 1, wherein responsive to receiving the regular VBI signal, both the first and second display pipelines are configured to process the next frame, and wherein responsive to receiving the repeat VBI signal, both the first and second display pipelines are configured to process the current frame again.

5. The apparatus as recited in claim 4, wherein each of the first and second display pipelines include a timing generator, wherein the apparatus is configured to program at least one timing generator to be a master timing generator for both the first and second display pipelines, and wherein each display pipeline is configured to send an indication to a first timing generator of the first display pipeline and to a second timing generator of the second display pipeline when receiving a frame packet for the next frame.

6. The apparatus as recited in claim 5, wherein each of the first display pipeline and second display pipeline is configured to utilize only one VBI signal pair, and wherein both the first display pipeline and second display pipelines are configured to utilize a same VBI signal pair.

7. A computing system comprising:
a display logically partitioned into a plurality of portions; and
a plurality of display pipelines, wherein each display pipeline of the plurality of display pipelines is configured to process and drive a portion of a same frame to a portion of the display;
wherein a first display pipeline of the plurality of display pipelines is configured to process the same frame again rather than a next frame, responsive to determining a second display pipeline of the plurality of display pipelines is not ready to process the next frame, wherein determining the second display pipeline is not ready to process the next frame comprises detecting a repeat vertical blanking interval (VBI) signal.

8. The computing system as recited in claim 7, wherein the first display pipeline is ready to process the next frame.

9. The computing system as recited in claim 8, wherein determining the second display pipeline is not ready to process the next frame comprises the first display pipeline receiving an indication that the second display pipeline has not received configuration data for the next frame soon enough to process the next frame.

10. The computing system as recited in claim 7, wherein each display pipeline comprises a timing generator, and wherein a first timing generator of a first display pipeline is configured to:
convey a regular VBI signal different from the repeat VBI signal to each display pipeline responsive to determining each display pipeline has already received a frame packet for the next frame; and
convey the repeat VBI signal to each display pipeline responsive to determining at least one display pipeline has not already received configuration data for the next frame.

11. The computing system as recited in claim 7, wherein each of the first and second display pipelines include a timing generator, wherein the computing system is configured to program one timing generator to be a master timing generator for both the first and second display pipelines, and wherein each display pipeline is configured to send an indication to a first timing generator of the first display pipeline and to a second timing generator of the second display pipeline when receiving a frame packet for the next frame.

12. The computing system as recited in claim 11, wherein each of the first display pipeline and second display pipeline is configured to utilize only one VBI signal pair, and wherein both the first display pipeline and second display pipelines are configured to utilize a same VBI signal pair.

13. A method comprising:
driving, by a first display pipeline, a first portion of a current frame to a first portion of a display;
driving, by a second display pipeline, a second portion of the current frame to a second portion of the display; and
receiving, by the first display pipeline, data corresponding to a next frame; and
conveying a regular vertical blanking interval (VBI) signal to the first and second display pipelines responsive to determining the first and second display pipelines are ready to drive the next frame;
conveying a repeat VBI signal different from the regular VBI signal to the first and second display pipelines responsive to determining at least one display pipeline is not ready to drive the next frame; and
the first display pipeline driving the current frame again when the second display pipeline is not ready to drive the next frame, wherein the second display is determined to not be ready to drive the next frame responsive to detecting the repeat VBI signal.

14. The method as recited in claim 13, wherein the first display pipeline is ready to process the next frame.

15. The method as recited in claim 14, wherein determining when the second display pipeline is not ready to drive the next frame comprises receiving an indication at the first display pipeline that the second display pipeline has not received configuration data for the next frame soon enough to process the next frame.

16. The method as recited in claim 13, further comprising processing the first portion of the current frame again at the first display pipeline responsive to receiving the repeat VBI signal.

17. The method as recited in claim 16, further comprising programming the first timing generator to be a master timing generator.

* * * * *